United States Patent [19]

Weir et al.

[11] Patent Number: 5,755,900
[45] Date of Patent: May 26, 1998

[54] METHOD OF MAKING MULTILAYER INSULATION PRODUCT

[75] Inventors: Charles Russell Weir, Westerville; Scott Stickle, Nashport, both of Ohio

[73] Assignee: Owens-Corning Fiberglas Technology, Inc., Summit, Ill.

[21] Appl. No.: 706,106

[22] Filed: Aug. 30, 1996

[51] Int. Cl.⁶ ........................................ B32B 31/20
[52] U.S. Cl. ........................ 156/62.2; 156/244.27; 156/309.6; 156/309.9
[58] Field of Search ................ 156/62.2, 309.6, 156/309.9, 244.27; 264/112

[56] References Cited

U.S. PATENT DOCUMENTS

| | | |
|---|---|---|
| 2,771,387 | 11/1956 | Kleist et al. ............ 156/62.2 X |
| 2,956,917 | 10/1960 | Fasano . |
| 3,249,659 | 5/1966 | Voelker . |
| 3,336,185 | 8/1967 | Helbing . |
| 3,957,940 | 5/1976 | Schubert et al. . |
| 4,208,230 | 6/1980 | Margarian . |
| 4,288,475 | 9/1981 | Meeker . |
| 4,349,590 | 9/1982 | Bolen et al. . |
| 4,381,200 | 4/1983 | Bolen et al. . |
| 4,536,911 | 8/1985 | Demetriades . |
| 4,622,192 | 11/1986 | Ma . |
| 4,826,722 | 5/1989 | Debouzie et al. . |
| 5,151,146 | 9/1992 | Green . |
| 5,211,988 | 5/1993 | Morton . |
| 5,294,461 | 3/1994 | Ishida . |
| 5,310,600 | 5/1994 | Tsuya et al. . |
| 5,336,526 | 8/1994 | Spoo et al. . |
| 5,492,722 | 2/1996 | Tait et al. . |

*Primary Examiner*—Michael W. Ball
*Assistant Examiner*—Sam Chuan Yao
*Attorney, Agent, or Firm*—C. Michael Gegenheimer; Curtis B. Brueske

[57] ABSTRACT

A method of making a multilayered insulation product includes applying a retention layer to a first fibrous insulation layer, where the retention layer is porous to enable liquids to pass therethrough, applying a hardenable liquid to the retention layer, where some of the liquid passes through the retention layer and contacts the first insulation layer, and hardening the liquid to bond the retention layer to the first insulation layer. A second fibrous insulation layer can be applied to the retention layer after the liquid is applied to the retention layer, in which case the hardening of the liquid bonds the retention layer to the second insulation layer.

13 Claims, 4 Drawing Sheets

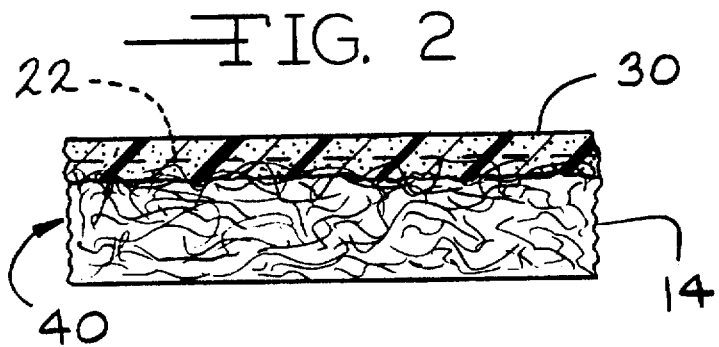
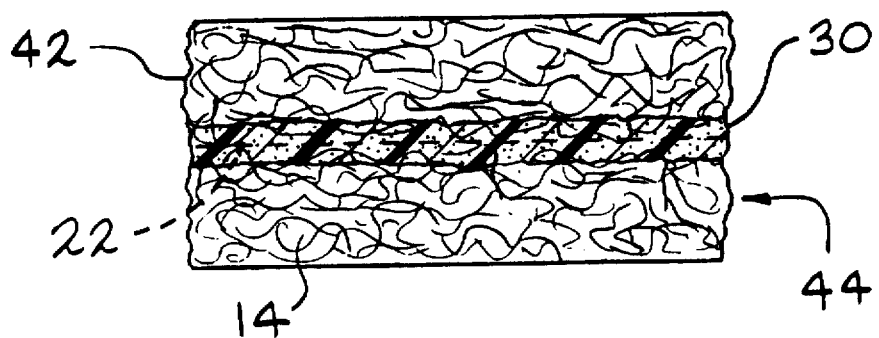
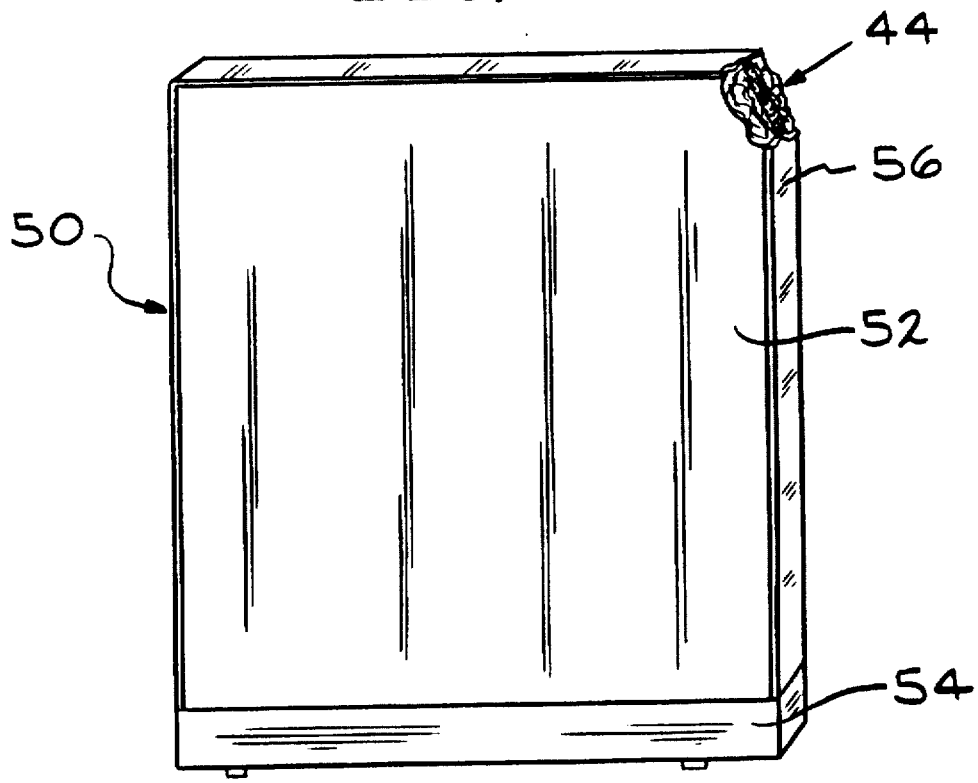

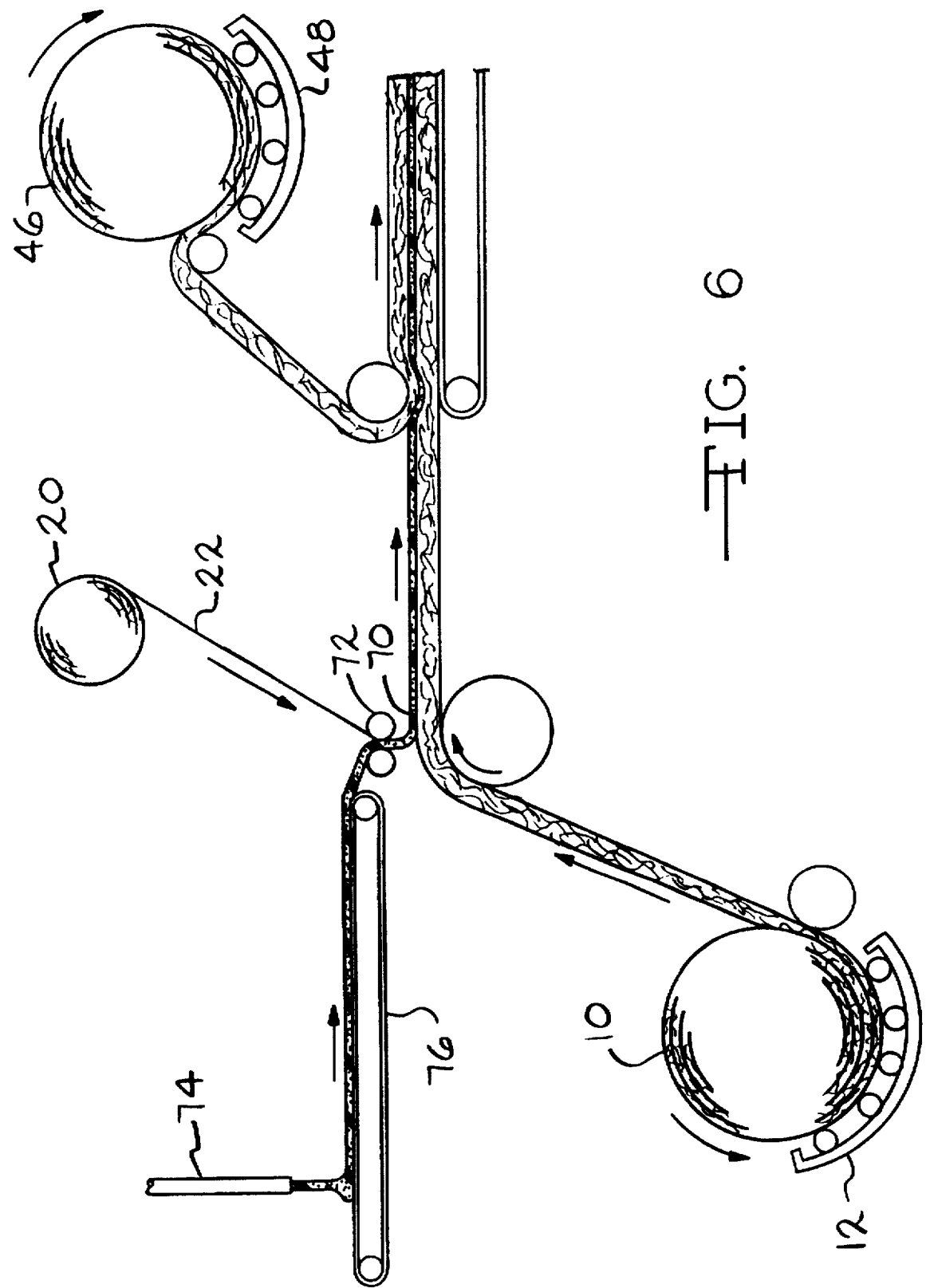

METHOD OF MAKING MULTILAYER INSULATION PRODUCT

TECHNICAL FIELD AND INDUSTRIAL APPLICABILITY

This invention relates in general to a method for making insulation products, particularly insulation products of fibrous materials. More specifically, this invention relates to a method of applying a hardenable liquid to multilayered insulation products. The invention will be useful for making acoustical insulation products for office panels, appliances, automotive applications, and heating, ventilating and air conditioning equipment.

BACKGROUND OF THE INVENTION

Insulation products are commonly used in various applications to prevent unwanted sound from escaping from a noise-producing device, such as a motor, machine or appliance. Also, acoustical insulation products are used in the interior walls and partitions of offices and residential dwellings to absorb sound and prevent its transmission. A typical form of acoustical insulation is a layer of mineral fiber insulation, such as fiberglass insulation, wrapped around or positioned around the source of unwanted noise. For example, a fiberglass blanket is usually incorporated in the front door panel of an under-the-counter dishwasher. The multiplicity of fibers in the blanket of glass fibers absorbs some of the sound energy. An advance in retarding or eliminating unwanted sound energy is the use of a reflecting layer positioned within the fibrous blanket to reflect some of the sound energy back into the sound absorbing fibers.

Existing methods of manufacturing acoustical insulation products include making a multilayer insulation product by applying a reflecting barrier to a first or bottom insulation layer and then applying a second or top insulation layer. The reflecting barrier is typically a film such as a paper or foil, or a layer of polymeric material, and the reflecting barrier is typically adhered to the top and bottom insulation layers by an adhesive or by the polymeric layer. A recent development to reduce the cost of the acoustical insulation product includes using a layer of asphalt as the reflecting barrier, and in some cases for laminating the two fibrous insulation layers together. Asphalt is a thermoplastic material that is quite inexpensive compared to most polymeric materials, and can be easily applied to the fibrous insulation.

The application of adhesive to bond the layers of a multilayered insulation product is not without potential problems, however. If the adhesive is too runny, the adhesive can penetrate too far into the fibrous blanket, thereby destroying some of the acoustical value of the insulation and wasting some of the adhesive. It is therefore desirable to apply the adhesive in a relatively viscous condition. Typically, the first or bottom insulation layer is moved beneath an adhesive applicator or discharge nozzle. However, when attempts are made to apply the adhesive in a viscous state, the tackiness of the adhesive can cause adherence of the top fibrous layers of the insulation blanket to the adhesive applicator, thereby causing a peeling or delamination of the fibrous insulation blanket. The fibrous insulation blanket is inherently susceptible to delamination. Delamination of the fibrous layer can cause product defects and require work stoppages to correct the situation. It would be advantageous in the manufacture of a multilayered insulation product to be able to apply an accurately metered amount of viscous material, such as an adhesive, to a fibrous insulation layer without causing delamination or peeling of the insulation layer. This could enable the insulation product to be made at higher production speeds and with a lower overall amount of adhesive.

SUMMARY OF THE INVENTION

The above object as well as other objects not specifically enumerated are achieved by a method of making a multi-layered insulation product in accordance with the present invention. In the method of the present invention, a retention layer is applied to a first fibrous insulation layer, with the retention layer being porous to enable liquids to pass therethrough. A hardenable liquid is applied to the retention layer, with some of the liquid passing through the retention layer and contacting the first insulation layer. The liquid is then hardened to bond the retention layer to the first insulation layer.

The objects of the invention are also accomplished by a method of making a multilayer insulation product which includes applying a retention layer to a first fibrous insulation layer, with the retention layer being porous to enable liquids to pass therethrough, applying a hardenable liquid to the retention layer, with some of the liquid passing through the retention layer and contacting the first insulation layer, and then applying a second fibrous insulation layer to the retention layer. The liquid is then hardened to bond the retention layer to both the first insulation layer and the second insulation layer.

BRIEF DESCRIPTION OF THE DRAWINGS

FIG. 2 is a schematic cross-sectional view in elevation of the multilayered insulation product shown in FIG. 1, taken along line 2—2.

FIG. 3 is a schematic cross-sectional view in elevation of the multilayered insulation product shown in FIG. 1, taken along line 3—3.

FIG. 4 is an interior panel containing a multilayered insulation product made according to the method of the invention.

FIG. 6 is a schematic cross-sectional view in elevation of apparatus for making a multilayered insulation product with a calender roll according to an alternate embodiment of the method of the invention.

DETAILED DESCRIPTION AND PREFERRED EMBODIMENTS

Figure 1:
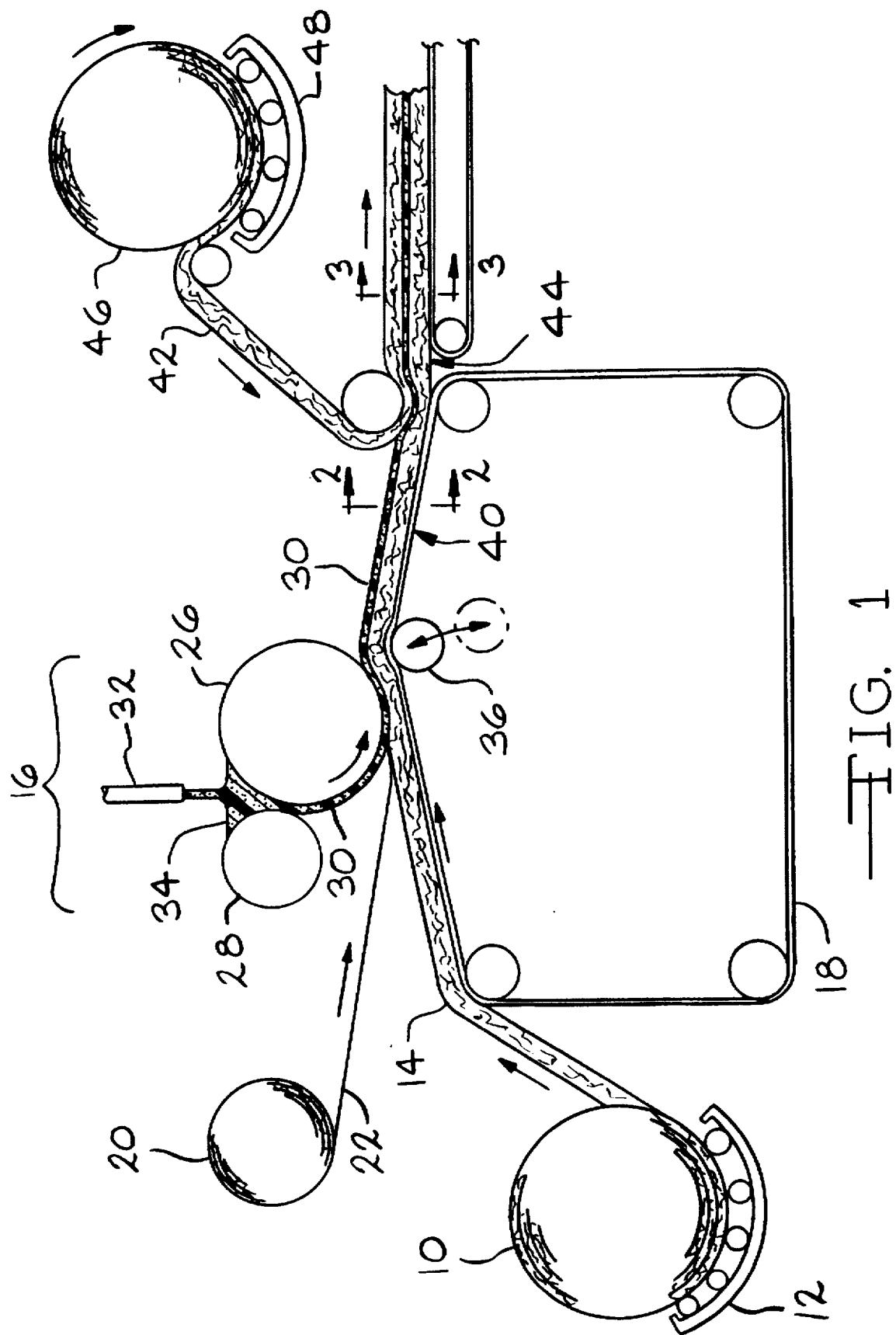
FIG. 1 is a schematic cross-sectional view in elevation of apparatus for making a multilayered insulation product according to the method of the invention.

Referring now to the drawings, FIG. 1 illustrates an apparatus for producing a multilayered insulation product according to the method of the invention. The apparatus includes a first roll 10 of fibrous insulation material, preferably in the form of a blanket. The first insulation roll can be supported or mounted in any suitable manner, such as by a cradle 12, for being payed out as a first insulation layer 14. The first insulation layer is transported past an adhesive applicator station, such as the asphalt applicator station indicated generally at 16, by applicator conveyor 18. Any means for moving the first insulation layer can be used. Typical line speeds for the applicator conveyor can be about 50 ft/sec (about 15 m/sec).

The insulation material can be any fibrous material suitable for absorbing sound energy. For purposes of illustration the fibrous insulation material in the first insulation layer is shown as being made of glass fibers. It is to be understood that other fibers can be used in the method of the invention, such as other mineral fibers and organic fibers. In automotive sound insulation applications, for example, the preferred insulation fibers may be polyester fibers or polypropylene fibers. Typically, the insulation material has between about 5% and about 10% by weight of a phenolic resin binder such as phenol-urea-formaldehyde, to enhance the tensile strength of the fiberglass. Preferably the fiberglass insulating material has a relatively low density between about 0.5 pounds per cubic foot (8 kg/m$^3$) and about 10 pounds per cubic foot (160 kg/m$^3$), more preferably between about 0.5 pounds per cubic foot (8 kg/m$^3$) and about 2 pounds per cubic foot (32 kg/m$^3$), and most preferably between about 0.9 pounds per cubic foot (14.4 kg/m$^3$) and about 1.5 pounds per cubic foot (24 kg/m$^3$). The glass fibers in the insulating material preferably have an average diameter between about 3 and about 25 microns, and more preferably between about 3 and about 12 microns. The fiber diameter and density of the glass fiber blanket can be varied to modify the sound absorption characteristics of the insulation layer. A preferred fiberglass insulating material, HV-24, is commercially available from Owens Corning, Toledo, Ohio. Several other types of fibrous insulation layers can be used with the invention. A blanket of mineral fibers can be used. The fibers can be formed into a cohesive blanket by several commonly known techniques, including subjecting the glass fibers to needlepunching, and adding a binder to the glass fibers.

Although the fiberglass layer may have fairly good tensile strength in the lengthwise or machine direction, it usually is quite weak in the vertical direction, and is very susceptible to delamination. Typically the first insulation layer has a separation strength or bond strength less than about 7 lbs/ft$^2$ (15.6 kg/m$^2$), as measured by an Instron machine (Instron Corporation, Canton, Mass.). The test for bond strength involves selecting 150 mm by 150 mm specimens, and bonding the tops and bottoms of the specimens with an adhesive to the upper and lower plates of the Instron machine. A tensile load is applied and the bond strength is the force at which the specimen separates or delaminates without an increase in the load.

As shown in FIG. 1, a roll 20 of a retention layer or veil 22, such as a spun bonded polyester fiber retention veil, is mounted to deliver the veil 22 into contact with the first insulation layer 14. The purpose of the retention veil is to hold down the upper strata or fibers in the first insulation layer as it passes the applicator station 16, thereby preventing the first insulation layer from delaminating. The applicator station is comprised of a coating roller or applicator roll 26 and a coater gap roller 28 which together form a gap through which a thin layer 30 of viscous, hardenable adhesive liquid, such as asphalt, passes. The liquid can be supplied in molten form as a stream 32 from a source, not shown, and can be accumulated as a pool 34 of molten liquid above the gap. The applicator roll can be heated to maintain the liquid at the correct temperature for operation of the process. The application temperature of asphalt is preferably within the range of from about 200° F. to about 475° F. (about 93° C. to 246° C.). A lift roller 36, or any other suitable means, can be used to cause an increase in the angle of wrap of the retention veil and the first insulation layer so that complete contact is made with the applicator roll 26. As shown, the lift roller can be mounted for movement to change the angle of wrap and the compression of the insulation.

As shown in FIG. 2, the multilayered insulation product 40 produced by the process of the invention includes the first fiberglass insulation layer 14, the adhesive layer 30 and the retention veil 22 which is embedded within the adhesive layer. As shown in FIG. 1, a second insulation layer 42 can be applied on top of the adhesive layer 30 to form a different multilayered insulation product 44 having two layers of fibrous insulation. The second insulation layer can be supplied from a roll 46 of fiberglass insulation material, which can be supported with a suitable cradle 48. The second insulation layer 42 should be applied to the adhesive layer 30 prior to the time that the adhesive layer 30 hardens so that a good bond between the retention veil and the second insulation layer is established. As shown in FIG. 3, the multilayered insulation product 44 includes first insulation layer 14, the adhesive layer 30 having the retention veil 22 embedded in it, and the upper or second fiberglass layer 42.

The multilayer insulation product of the invention, either the single insulation blanket product 40 or the double insulation blanket 44, can be incorporated into numerous products. One such product is the interior panel 50 shown in FIG. 4. The panel is comprised of major faces 52, base 54, sides 56 and a multilayered insulation product 44 made according to the present invention and positioned within the walls of the panel. A more detailed explanation of the interior panel is provided in commonly assigned U.S. patent application Ser. No. 08/544,687, filed Oct. 18, 1995, which is hereby incorporated by reference in its entirety.

As the molten adhesive 30 comes into contact with the fiberglass insulation layer 14, it is desirable to establish the viscosity of the molten adhesive high enough so that it will saturate the veil, but penetrate only minimally into the upper strata or layers of the first insulation layer. Preferably, when asphalt is used the viscosity of the molten asphalt is within the range of from about 500 to about 100,000 centipoise, and most preferably the viscosity is about 2000 centipoise. This viscosity would be measured in the center of the pool 34 of asphalt at a temperature of 400° F.(204° C.). It can be appreciated that the molten asphalt is a liquid which will quickly cool and harden once it is formed into a thin layer 30 and once it contacts the first insulation layer. Such asphalt is preferably applied at a rate within the range of about 0.1 to about 0.7 lb/ft$^2$ (about 0.49 to about 34 kg/m$^2$), and more preferably at a rate of about 0.3 lb/ft$^2$ (about 1.5 kg/m$^2$).

Although the hardenable liquid is disclosed above as being molten asphalt, numerous other viscous materials could also be applied to the first insulation layer to bond the multilayered insulation product together and to provide a solid barrier for sound transmission through the product. For example, the hardenable liquid could be a thermoplastic adhesive such as a hot melt polymeric material, an example of which is hot melt adhesive No. 50-823, from Reynolds Adhesive, Greenville, S.C. The hardenable liquid could also be a thermoset adhesive, such as an epoxy adhesive. Other examples include water-based latex adhesives, such as aqueous adhesive No. 20983 from Northwest Adhesives, Minneapolis, Minn. Where the multilayered insulation product has two or more layers of insulation, the hardenable liquid should be sufficiently tacky to provide a good bond between the retention veil and the second insulation layer.

The type of asphalt used in the layer 30 is not critical. The asphalt can be any bituminous material such as tars, pitches or asphalts. The asphalt can be any natural or petroleum derived asphalt. The common source of asphalt is the residue or bottoms from the petroleum refining industry which includes those commonly referred to as paving grade, roofer's flux, propane washed and air-blown.

The asphalt can optionally be modified with a polymer to give it improved flexibility during handling, and improved resistance to flow to prevent changes in thickness from top to bottom in the sound screen. A preferred polymer is a styrene/butadiene copolymer such as Kraton 1101 (20% styrene, 75% butadiene) from Shell Co., Houston, Tex. The weight ratio of asphalt to polymer is preferably between about 6:1 and about 20:1. The polymer can be mixed into the asphalt under high shear at 300° F. (149° C.) to 400° F. (204° C.).

Another preferred polymer is formed by copolymerization of SBS thermoplastic rubber and styrene monomer. Such a polymer is described in more detail in U.S. Pat. No. 4,273,685 to Marzocchi et al., issued Jun. 16, 1981, and U.S. Pat. No. 4,333,866 to Uffner, issued Jun. 8, 1982.

Other polymers that may be useful as asphalt modifiers include ethylene copolymers such as Elvax® 450 (ethylene vinyl acetate copolymer) or Elvaloy® AM (ethylene butylacrylate glycidyl methacrylate terpolymer) both made by Du Pont (Wilmington, Del.). Other polymers can include polybutadiene or polypropylene.

Various fillers can be incorporated into the layer 30 to increase the mass of the layer and thus reduce the amount of sound transmitted through the sound reflecting barrier. Preferably the filler is selected from calcium carbonate, calcium oxide, clay, glass, mica, barium, and mixtures thereof. More preferably the filler is calcium carbonate because it is inexpensive and contributes significant mass. Additives can also be incorporated into the layer 30 to provide it with additional properties such as fire retardancy. The type and amount of filler can affect the flexibility of the product. The resulting combination should retain the quality of being relatively easy to cut so that the product can be easily fabricated.

The retention veil 22 can be any film or web suitable for holding down the upper strata of the first insulation layer. It can be woven or nonwoven. Preferably the veil has a tensile strength greater than about 3 lbs/inch width (greater than about 0.54 kg/cm width). The retention veil must be porous or perforated, preferably having a Frasier air permeability within the range of from about 300 to about 1500 cubic feet/minute per Ft.$^2$ (about 5,490 to about 27,450 m$^3$/hr per m$^2$), and most preferably a Frasier air permeability within the range of from about 800 to about 1000 cubic feet/minute per Ft.$^2$ (about 14,640 to about 18,300 m$^3$/hr per m$^2$). The retention veil is preferably a spunbonded polyester porous web, having a weight within the range of from about 0.75 to about 1.0 oz. per yd.$^2$ (about 25 to about 34 g/m$^2$). Preferred retention veils are Remay spunbonded polyester veils Nos. 2011 and 2014 from Remay, Inc., Old Hickory, Tenn. The retention veil must have a service temperature higher than the temperature of the molten adhesive. If, for example, asphalt is to be applied at a temperature of about 400° F. (204° C.), then the retention veil should have a service temperature of at least 450° F. (232° C.). A polypropylene porous veil could be used, but since polypropylene has a relatively low service temperature, a relatively cool adhesive must be used in that case. The retention veil 22 can be a polyester film that has been perforated to render it porous to the liquid, hardenable adhesive, and yet is capable of holding down the first insulation layer and preventing it from delaminating during the adhesive application process.

During application of the adhesive the retention layer 22 compresses the first insulation layer 14, thereby making the application process easier and assuring complete contact between the adhesive layer 30 and the first insulation layer. Typically during the application of asphalt the first insulation layer is compressed to a thickness within the range of from about 0.5 to about 0.1 times the uncompressed thickness of the first insulation layer.

A benefit in having the retention veil embedded in the adhesive is that it can increase the tensile strength of the adhesive layer 30 after the adhesive has solidified. This can be particularly advantageous during cold weather exposure when the adhesive layer may become brittle and susceptible to cracking. The presence of the veil can increase the flexural strength and reduce the modulus of rigidity. The modulus of rigidity can be increased by using a glass fiber mat as the retention veil.

Figure 5:
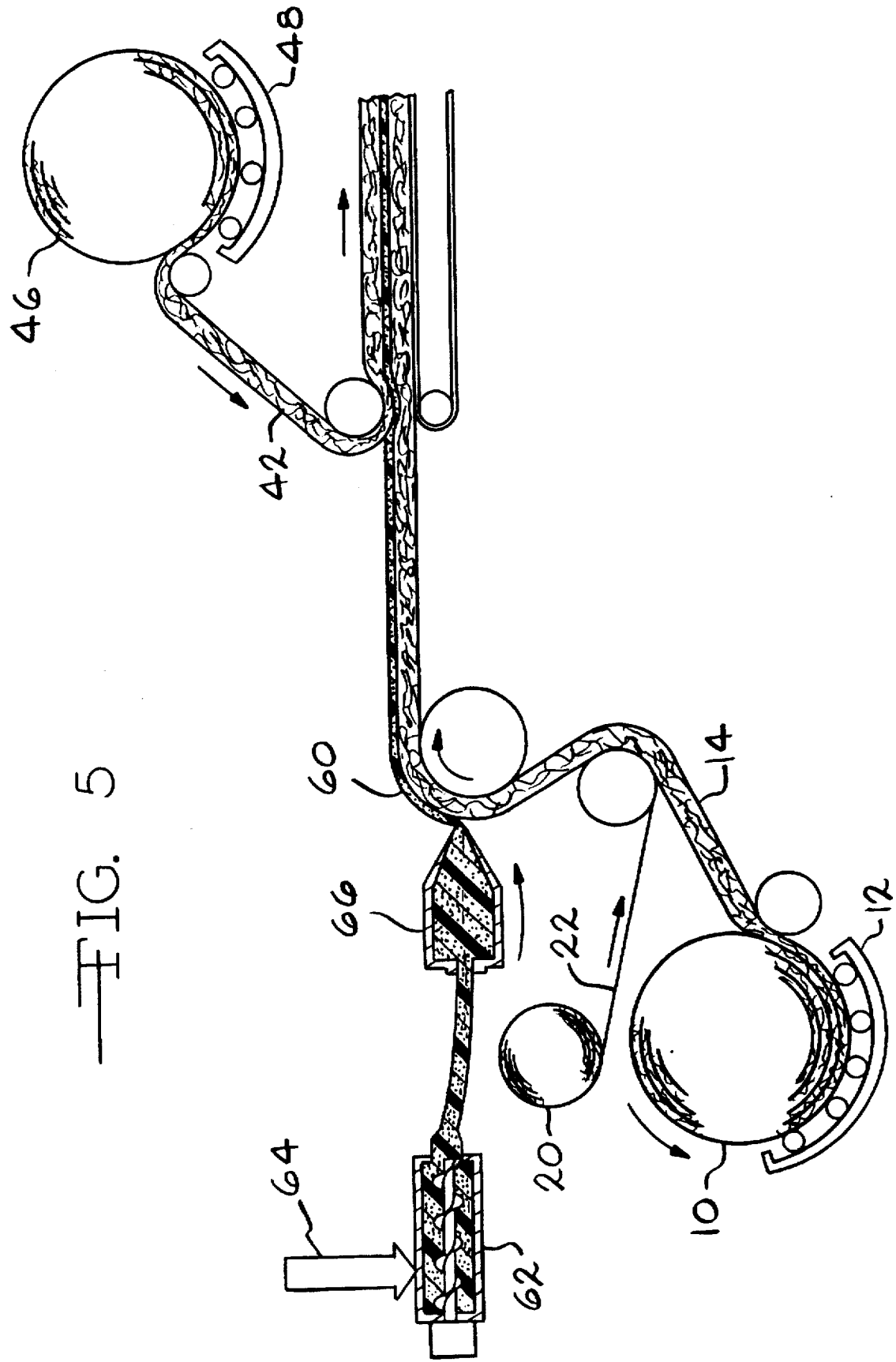
FIG. 5 is a schematic cross-sectional view in elevation of apparatus for making a multilayered insulation product with an extrusion die according to an alternate embodiment of the method of the invention.

As shown in FIG. 5, the viscous, hardenable liquid does not necessarily have to be added with an applicator roll, but can be applied as an extruded layer 60 to the first insulation layer 14. An extruder 62 receives a molten stream 64 of adhesive such as asphalt from a source, not shown, and extrudes a thin layer of adhesive which exits from a nozzle 66 and into contact with the surface of the first insulation layer 14. The type of extruder to be used will vary depending on the viscosity of the hardenable liquid to be applied and the temperature and volume of the liquid.

As shown in FIG. 6, the viscous, hardenable liquid can also be applied as a layer 70 which has been formed into a thin film by a calender roll 72. The calender roll can be supplied with a slab of adhesive such as asphalt formed by dropping adhesive from a molten stream 74 onto one or more conveyors 76 which allow the adhesive to spread out and cool to form a warm slab. The calender roll 72 may be heated to provide the appropriate viscosity and temperature control for the adhesive. The viscosity of calendered asphalt will be relatively high, but the asphalt can still be considered a hardenable liquid since the asphalt will cool and solidify upon contact with the fibers in the first insulation layer 14. It should be understood that additional methods of applying the hardenable liquid to the first insulation layer can be used.

In summary, the retention veil 22 is sufficient to enable a viscous material to be applied to a fibrous layer 14 having a density as low as 0.5 pounds per cubic foot (8 kg/m$^3$), and as high as about 10 pounds per cubic foot (160 kg/m$^3$) without damaging the substrate. It should be understood that although the invention has been illustrated with the hardenable liquid being an asphalt material, the method of the invention may also be advantageously used in applying numerous other hardenable liquids to fibrous substrates. Further, any number of layers of fibrous insulation and hardenable liquid may be incorporated into the multilayered insulation products.

The principle and mode of operation of this invention have been described in its preferred embodiment. However, it should be noted that this invention may be practiced otherwise than as specifically illustrated and described without departing from its scope.

We claim:

1. A method of making a multilayered insulation product comprising:

applying a retention layer to a first fibrous insulation layer which is susceptible to delamination, the retention layer being a material selected from films and webs, where the application of the retention layer compresses the first insulation layer during the application of the liquid;

applying a hardenable liquid to the retention layer, the retention layer having a Frasier air permeability of at least about 300 ft$^3$/min per ft$^2$ (5,490 m$^3$/hr per m$^2$)

such that some of the liquid passes through the retention layer and forms an adhesive layer on the first insulation layer, and the retention layer having a Frasier air permeability of not greater than about 1500 ft$^3$/min per ft$^2$ (27,450 m$^3$/hr per m$^2$) such that the liquid penetrates only minimally into the first insulation layer, and the retention layer prevents delamination of the first insulation layer during the application of the liquid;

applying a second fibrous insulation layer to the retention layer; and hardening the liquid to bond the retention layer to the first insulation layer and to the second insulation layer.

2. The method of claim 1 in which the liquid is applied to the first insulation layer by contacting the retention layer with a coating roller.

3. The method of claim 2 in which the coating roller is heated to control the viscosity of the liquid.

4. The method of claim 1 in which the liquid is applied to the first insulation layer by extruding the liquid through an extruder.

5. The method of claim 1 in which the liquid is applied to the first insulation layer by passing the liquid through a calender roll.

6. The method of claim 1 in which the first insulation layer has a bond strength less than about 7 lbs/ft$^2$(15.6 kg/m$^2$).

7. The method of claim 1 in which the first insulation layer is compressed to a thickness within the range of from about 0.5 to about 0.1 times the uncompressed thickness of the first insulation layer.

8. The method of claim 1 in which the liquid is an asphalt material.

9. The method of claim 1 including the additional steps of applying a second retention layer, a second application of hardenable liquid, and a third insulation layer to the second fibrous insulation layer.

10. The method of claim 1 in which the liquid has a viscosity within the range of from about 500 to about 100,000 centipoise.

11. A method of making a multilayered insulation product comprising:

applying a retention layer to a first mineral fiber insulation layer which is susceptible to delamination, the retention layer being a material selected from films and webs, where the application of the retention layer compresses the first insulation layer during the application of the liquid, the compression being within the range of from about 0.5 to about 0.1 times the uncompressed thickness of the first insulation layer;

applying a liquid asphalt to the retention layer, the retention layer having a Frasier air permeability of at least about 300 ft$^3$/min per ft$^2$(5,490 m$^3$/hr per m$^2$) such that some of the liquid asphalt passes through the retention layer and forms an adhesive layer on the first insulation layer, and the retention layer having a Frasier air permeability of not greater than about 1500 ft$^3$/min per ft$^2$(27,450 m$^3$/hr per m$^2$) such that the liquid asphalt penetrates only minimally into the first insulation layer, and the retention layer prevents delamination of the first insulation layer during the application of the liquid asphalt;

applying a second mineral fiber insulation layer to the retention layer; and hardening the liquid asphalt to bond the retention layer to the first insulation layer and to the second insulation layer.

12. The method of claim 11 in which the liquid has a viscosity within the range of from about 1,000 to about 100,000 centipoise.

13. The method of claim 11 in which the retention layer is a spun bonded polyester web.

* * * * *